(12) United States Patent
Zhang et al.

(10) Patent No.: US 8,149,917 B2
(45) Date of Patent: Apr. 3, 2012

(54) TRANSITION CREATION FOR ENCODED VIDEO IN THE TRANSFORM DOMAIN

(75) Inventors: Dengzhi Zhang, San Jose, CA (US); Charles Lawrence, Fremont, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1091 days.

(21) Appl. No.: 12/024,707

(22) Filed: Feb. 1, 2008

(65) Prior Publication Data

US 2009/0196346 A1    Aug. 6, 2009

(51) Int. Cl.
H04N 7/12    (2006.01)
(52) U.S. Cl. .............................. 375/240.18; 375/240.24
(58) Field of Classification Search .................... None
See application file for complete search history.

(56) References Cited

U.S. PATENT DOCUMENTS

| | | | | |
|---|---|---|---|---|
| 5,321,440 | A * | 6/1994 | Yanagihara et al. | 375/240.2 |
| 5,408,274 | A | 4/1995 | Chang et al. | 348/700 |
| 6,941,019 | B1 * | 9/2005 | Mitchell et al. | 382/232 |
| 7,050,113 | B2 * | 5/2006 | Campisano et al. | 348/581 |
| 2003/0169373 | A1 | 9/2003 | Peters et al. | 348/593 |
| 2006/0285586 | A1 | 12/2006 | Westerman | 375/240 |
| 2006/0285819 | A1 | 12/2006 | Kelly et al. | 386/52 |
| 2008/0232452 | A1 * | 9/2008 | Sullivan et al. | 375/232 |
| 2009/0196346 | A1 * | 8/2009 | Zhang et al. | 375/240.03 |
| 2010/0118972 | A1 * | 5/2010 | Zhang et al. | 375/240.24 |

FOREIGN PATENT DOCUMENTS

WO    WO 99/18735    4/1999

OTHER PUBLICATIONS

Chang, Shih-Fu, et al., "Manipulation and Compositing of MC-DOT Compressed Video," *IEEE Journal on Selected Areas of Communications*, Jan. 1995, vol. 13, No. 1, pp. 1-11.
Noguchi, Yoshihiro, et al., "MPEG Video Compositing in the Compressed Domain," *IEEE International Symposium on Circuits and Systems*, vol. 2, May 1, 1996, pp. 596-599.
Smith, Brian C., et al., "Algorithms for Manipulating Compressed Images," *IEEE Computer Graphics and Applications*, vol. 13, No. 5, Sep. 1, 1993, pp. 34-42.
European Patent Office, Supplementary European Search Report, Application No. EP 09 70 8211, dated Jan. 5, 2011, 6 pages.
Korean Intellectual Property Office, International Search Report; PCT/US2009/032457, Jul. 22, 2009.

* cited by examiner

*Primary Examiner* — Robert Wilson
(74) *Attorney, Agent, or Firm* — Sunstein Kann Murphy & Timbers LLP

(57) ABSTRACT

A system and method for calculating data representative of at least one intermediary transition image between a first image and a second image in the encoded domain is disclosed. Cinematic transitions can be created between encoded still images and frames from video sequences. For each corresponding location within the first and second image, a transform coded value is calculated for the at least one intermediary image using the transform encoded data of the first and second images without transform decoding the transform encoded data. The transform coded values can be fully encoded using a compression protocol and transmitted to a device for decoding and display of the cinematic transition.

38 Claims, 9 Drawing Sheets

TRANSITION CREATION FOR ENCODED VIDEO IN THE TRANSFORM DOMAIN

TECHNICAL FIELD

The present invention relates to image processing, and more particularly to construction of intermediary images in the encoded domain for transitions between encoded video images.

BACKGROUND ART

The impressive performance of modern compression algorithms combined with the growing availability of software and hardware video encoders and decoders have made encoded content prevalent. The MPEG (Motion Pictures Expert Group) standards have been extensively used in both commercial and consumer applications. A sample MPEG video compression and decompression system is shown in FIG. 1. Pixel data is input to the system and each macroblock (16×16 group of pixels) undergoes transform coding using a discrete cosine transform. The resulting data is quantized and will be entropy encoded if the macroblock is intracoded. The quantized data is passed through a feedback loop wherein the quantized data is dequantized and passed through an inverse transform. The resulting pixel data is then stored and used for the processing of subsequent macroblocks for calculating motion vectors in a motion estimation block as well as motion estimated difference values (difference values between similarly located macroblocks in subsequent frames) for interceding. The motion vectors and motion estimated difference values are subsequently entropy encoded and output in the output bitstream.

The MPEG decoder receives in the encoded output bitstream from the encoder and first entropy decodes the received bitstream. As the data is entropy decoded, If the data is identified as spatially encoded macroblock data, the data is passed through a reverse quantizer and an inverse DCT transform resulting in pixel values for the macroblock location. The pixel values are then stored and can be used for determining macroblock pixel values for a macroblock in a subsequent macroblock that has been interceded. If the resulting data is identified as a motion vector the motion vector is passed to a motion compensation module. Based upon the received motion vector for a given macroblock location, the motion compensation module retrieves macroblock data that has been stored at which the motion vector points and the motion compensation modules determines the pixel values for the macroblock location associated with the motion vector. In addition, difference values for interceded macroblocks may be received in the input bitstream and those values are either added or subtracted from the stored pixel values for a macroblock from a previous video frame that shares the same macroblock location. Once the data has been decoded into pixel values the resulting pixel value bitstream is output and may be displayed on a display device.

Creators and editors of encoded video content who desire to create standard cinematic effects such as fade-in, fade-out, and cross fade operate in the spatial/pixel domain. In the pixel-domain, the fading between two images can be expressed in the following formula, $$p_{new} = \alpha \cdot p_a + (1-\alpha) \cdot p_b$$

where p is the pixel value in the pixel domain, and $\alpha = [0, 1]$ is the fading weight. If $p_b$ is monotonic color, it is called fade in (if $\alpha = 0 \rightarrow 1$) and fade out (if $\alpha = 1 \rightarrow 0$). Otherwise it is called cross fade. Thus, the creators and editors that work with encoded video content are forced to first decode each frame of the video content manipulating the data in the spatial/pixel domain to create these effects and then re-encode the frames. Therefore, in order to create these cinematic effects, a number of processor intensive steps must occur, especially the performance of transform decoding and encoding.

Automatic creation of such effects in real-time in a networked environment, such as through the internet or a cable television system, have proved difficult due to the processing requirements and latency.

SUMMARY OF THE INVENTION

In a first embodiment of the invention there is provided a method for calculating data representative of at least one intermediary transition image between a first image and a second image. The first and second images are represented by transform encoded data, such as DCT coefficients. The method includes calculating a transform coded value for the at least one intermediary image using the transform encoded data of the first and second images without transform decoding the transform encoded data at a corresponding location within the first and second image. For each intermediary frame, transform coded values are calculated for each pixel location. The transform coded values for at least one intermediary image are stored to memory. The image data forming the first image and the second image may be individual frames from one or more video sequences or may be still images. The image data for the first and second images may be intra-frame encoded.

If one of the images is from a video sequence, image data is parsed from the video sequence. For example, an I-frame may be located within an MPEG stream. This may be done for both the first image and the second image. The transform coded values that are determined for the intermediary image may be either intra-frame or inter-frame coded. A process may occur for determining whether the frames should be intra-frame or inter-frame encoded. In some embodiments, the determination is made automatically by a computer system. Separate equations are employed for determining the intra-frame values and the inter-frame values.

In some embodiments both the first and second images may be represented by fully encoded MPEG I-frame data. In other embodiments, the first and second image data may be quantized transform coefficients, and in still other embodiments the first and second image data may simply be transform coefficients. The system will decoded any data from the first or second image that is not transform-encoded data. Thus, an MPEG I-frame would be entropy decoded and dequantized in one embodiment.

If the first and second image data are MPEG I-frames and the first and second image data has been encoded using the same quantization step size and quantization matrix, the data need only be entropy decoded leaving the data as quantized transform-encoded data. Thus, intermediary frames can be calculated from the quantized transform-encoded data. Once the data for one or more intermediary images is calculated the data can be inserted between the first image and the second image data. For example, the intermediary images could be inserted into an MPEG sequence wherein appropriate formatting and updating of the headers occurs.

The intermediary images can produce effects, such as fade-in, fade-out or cross-fade. The first or second image may be a monotonic image for fade-in or fade-out.

In other embodiments, the methodology may be embodied as a computer program on a computer readable storage medium.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

As used in the following specification and the accompanying claims, the term "encoded" shall mean the process of creating a compressed image or video stream, unless the context indicates otherwise. Data representative of an image shall be considered encoded if at least a portion of the process has been performed. For example, compression algorithms that spatially compress image and video data include in general three steps: transform processing, quantization, and entropy encoding. Thus, image data may be considered to be encoded, or partially encoded, if the data has been transformed by passing the spatial data through a transform. The term "macroblock" shall mean an MPEG (Motion Pictures Expert Group) macroblock. A macroblock is generally a 16×16 group of pixels at a specified macroblock location in an image when referenced in the spatial domain and a 16×16 group of frequency values when referenced in the transform domain. The values in a transformed macroblock are the transform coefficients.

The present invention as embodied is directed to the creation of one or more intermediary images between two images from encoded video sources wherein the intermediary images are determined in the transform domain. Transitions may occur between an encoded monotonic image (e.g. black, white image, or other singular color) and an encoded image from a video stream providing for a fade-in or a fade-out or the transitions may occur between two encoded sources (images from video streams or still images) creating a cross-fade. The encoded content is never completely decoded to the spatial/pixel domain, rather determination of the encoded data for one or more intermediary images for the transition are determined within the transform domain. If the intermediary images are to be encoded according to an MPEG specification, the present invention as embodied can encode the intermediary images as either I or P frames.

Figure 1:
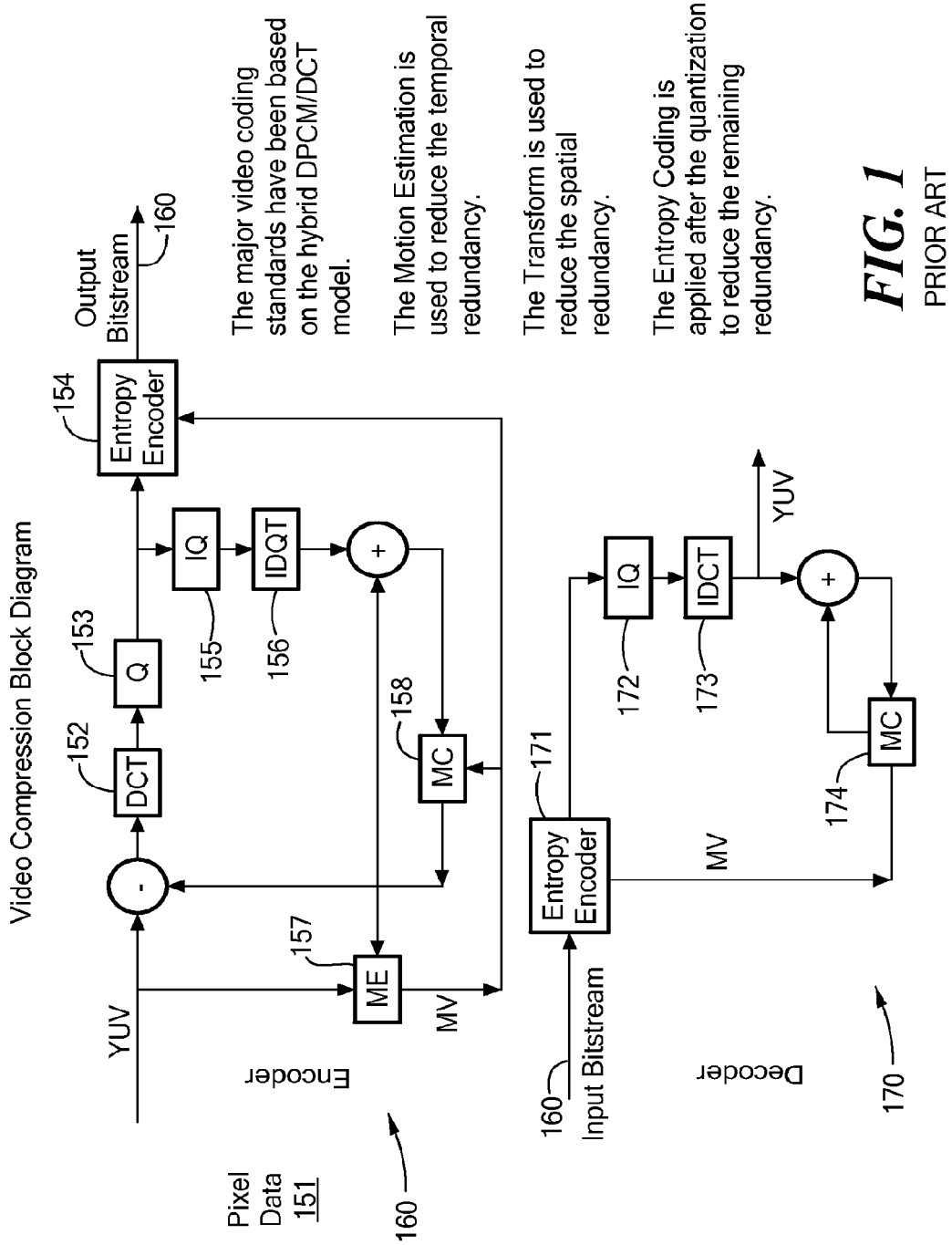
FIG. 1 shows an exemplary video compression block diagram.
Figure 1A:
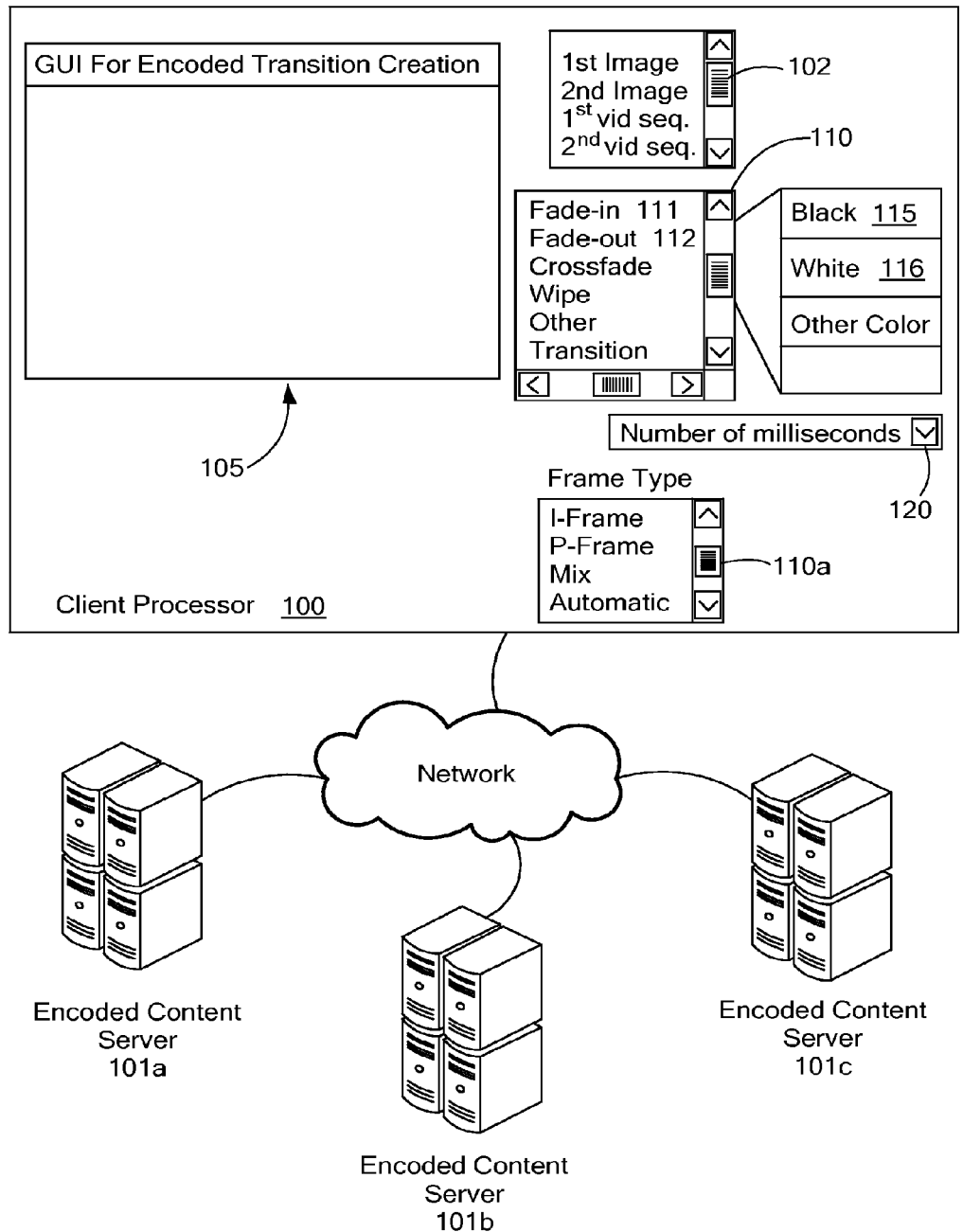
FIG. 1A shows a first environment in which the present invention for creating cinematic effects in an encoded domain may be embodied.

FIG. 1A shows a first environment in which the present invention may be embodied. In this environment a client device 100 allows a user to access a plurality of encoded files from one or more servers 101a, 101b, 101c. The client device provides an editing environment (graphical user interface) 105 for creating encoded content. The user can select in a selection box 102 the encoded files and in a second selection box 110 from a plurality of transitions. The user can select to have a fade-in 111 from a monotonic image to an encoded image stream. For example, a fade-in 111 from a black image 115 to a first I-frame encoded image of an MPEG video stream wherein one or more intermediary images are created between the monotonic image and the first I-frame. The user can select the length of the transition 120, which will be a number of images and will depend upon the playback format. For example, the MPEG video stream may be displayed at 24 frames per second, 30 frames per second, or 60 interlaced fields per second. The user may choose to have a fade-out 112 from a last video image in an MPEG video stream to a monotonic image. For example, a final I-frame video image from an MPEG video will fade over one or more frames to a white monotonic image 116. The user may also wish to transition between encoded video sequences. For example, the user may wish to have a cross fade 113, wherein the last intracoded image of a first encoded video sequence transition over one or more images to a first intracoded image of a second encoded video sequence. If both video sequences are MPEG encoded video sequences, the last I-frame from the first encoded video sequence is cross-faded to the first I-frame image of the second encoded video sequence. The environment provides a user interface for user selection of the transition 110, the monotonic transition image (in the case of fade-in and fade-out), the type of frames to create 110a (I-frame or P-frame or a combination of the two, automatic selection or a default selection) and the number of frames corresponding to the time for the transition (e.g. for a 2 second transition wherein the display rate is 60 frames/second, the number of intermediary images is 118) 120. If the creator selects to have the intermediary images be encoded as I-frames, each intermediary frame will be intracoded. Therefore, each macroblock of the intermediary images contains DCT-transform coefficient data that is representative of the pixel data for that macroblock. If the creator selects to have the intermediary images encoded as P-frames, then the intermediary images will contain the difference information between the present frame and the previous frame. All motion vectors will be zero, since there is no motion. The creator may also select to have a combination of I and P frames. The creation of the intermediary images need not be limited to a single frame type. It should be recognized by one of ordinary skill in the art that the encoded video content, as well as, the processing of the video content may occur on a single computing device without need for the client/server architecture shown in FIG. 1.

Figure 2:
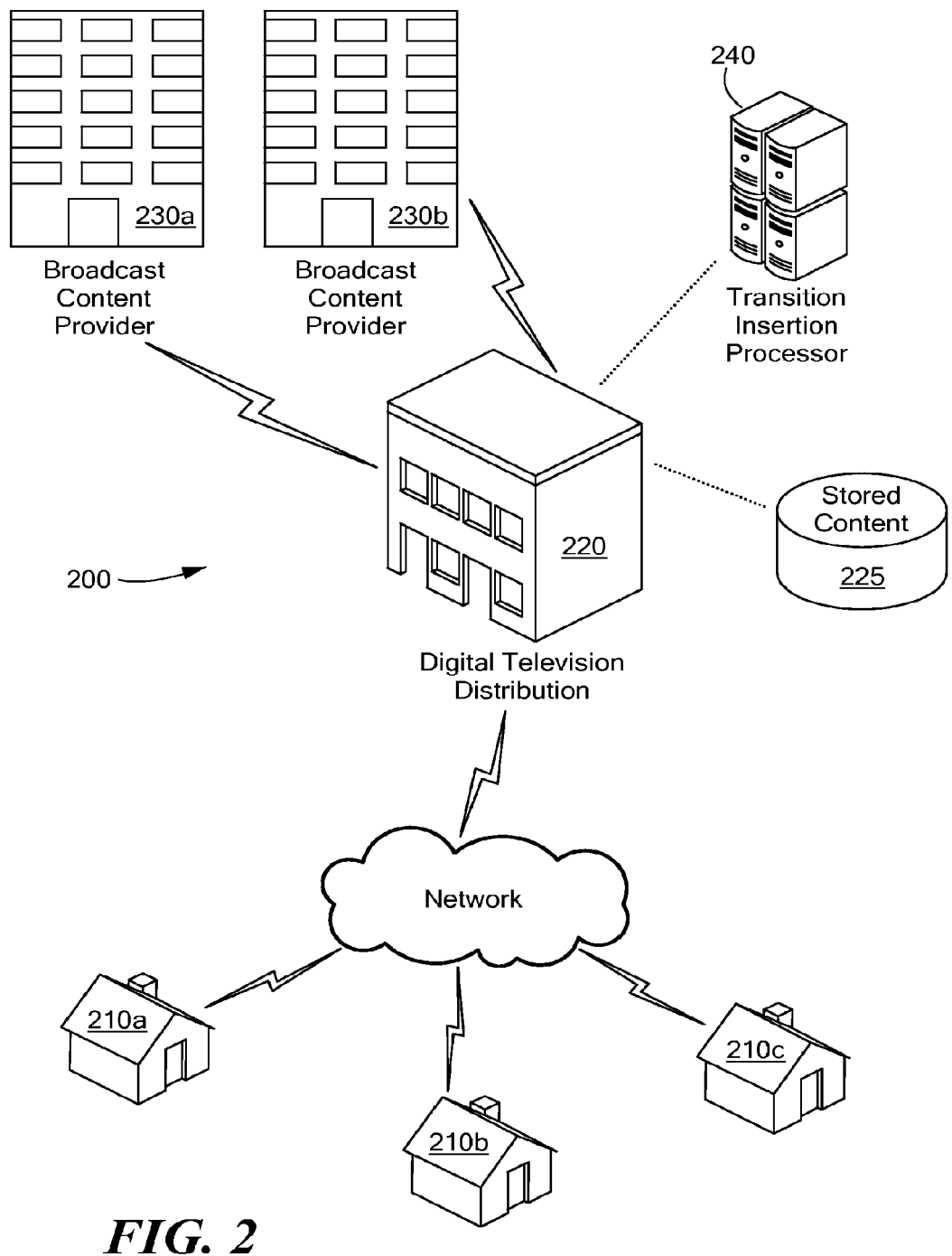
FIG. 2 shows a second environment that includes an automatic system for creating transitions between encoded video content.

In a second environment as shown in FIG. 2, rather than allowing for user creation of content, the environment is an automatic system for transitioning between encoded video content. For example, in an interactive cable television environment 200 wherein all content is provided to a user's set-top box as one or more MPEG encoded video streams, a user at his home 210a,b,c may select an on-demand service and will be provided with that content from a digital television distribution center 220. The digital television distribution center 220 will either retrieve content from a stored content memory location 225 or receive broadcast content from broadcast content providers 230a,b. The digital television distribution center 220 will access a transition insertion processor 240 that will automatically insert intermediary images between the currently viewed image (e.g. an encoded selection screen) that is displayed to the user and the selected on-demand service. Thus, there may be a cross fading between a selection screen and the user selected content. In another application of automatic transitions, in an IP television environment, advertisements and television programming are combined together in real-time by the transition insertion processor of the digital television distribution center, which determines the number of intermediary images based upon a pre-determined temporal framework. For example, a broadcast network program may be scheduled to have 2 minutes of commercials inserted into the MPEG video stream at 7:13 pm. The local IP television network provider can insert commercials during this two minute period. Transitions can be automatically created between commercials and the length of the transitions can be calculated, so that the commercials and transitions completely fill the 2 minute interval.

Thus, this system can provide for real-time creation of transitions in the encoded domain. For example, three local commercials may total only 1:54 and therefore 6 seconds of transitions are necessary. The transition insertion processor would determine that 6 seconds of transitions are needed and would include cross-fade, or fade-in, fade-out for each commercial. If the transition insertion processor is configured to perform fade-in and fade-out for each commercial, there will be 6 fades. As a result each fade will be 1 second in length.

Figure 3A:
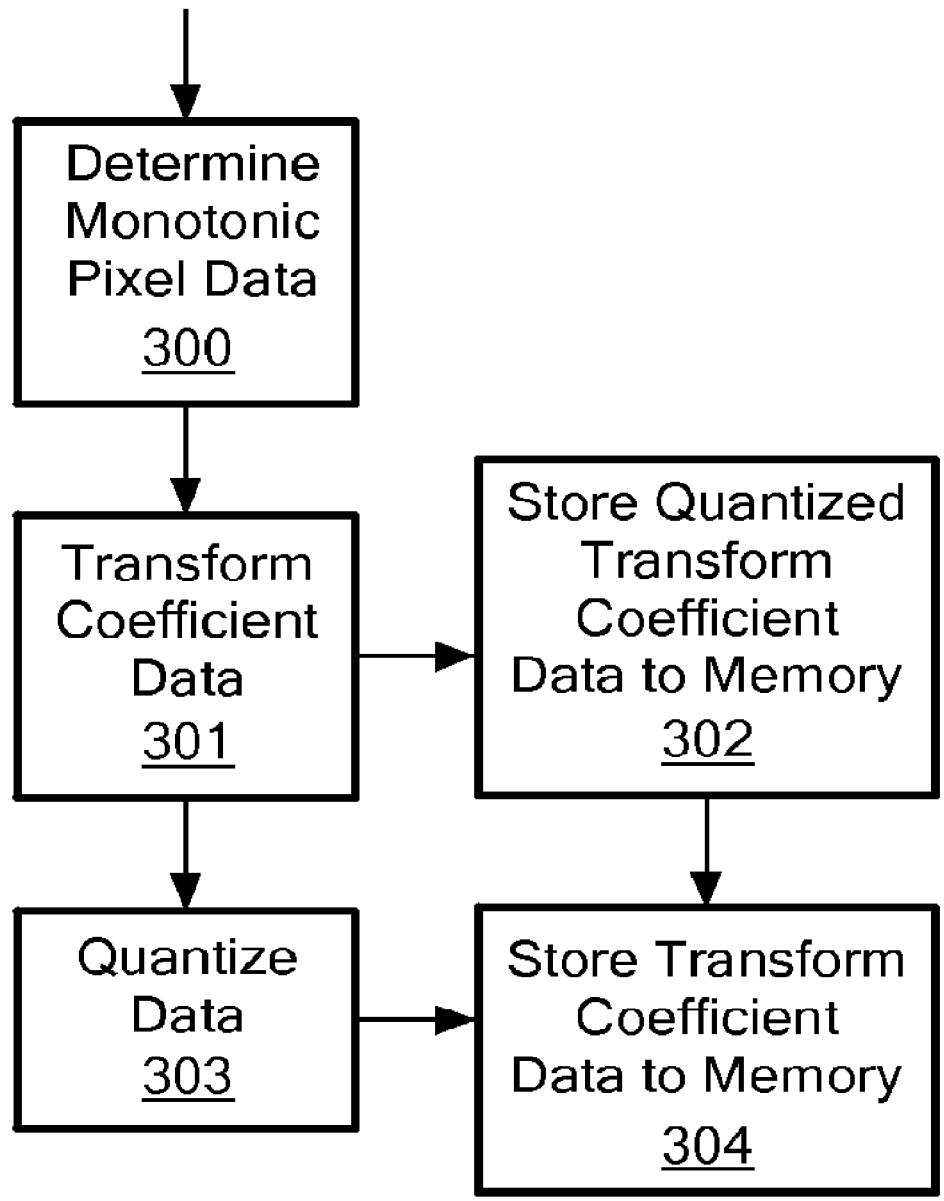
FIG. 3A shows a flow chart of pre-processing of monotonic image data.

FIGS. 3A-F are flow charts that express the steps taken by a processing module, such as the transition insertion processor of FIG. 2, to create intermediary frames from encoded or partially encoded data representative of two images that are intracoded in order to produce cinematic effects. The present application will assume that the images are encoded using the MPEG (Motion Pictures Experts Group) standard, although other CODECs may be used that employ frequency domain coefficients. Prior to the steps shown in the flow charts of FIG. 3B-F, the processor will pre-process monotonic pixel data as shown in FIG. 3A. The monotonic pixel data (e.g. white or black image) will first be retrieved 300. The monotonic pixel data will then be transform coded 301 and the transform coded coefficients for each macroblock will be stored to memory 302. The transform coded coefficients will also be quantized 303. The quantized transform coefficients for each macroblock will also be stored in memory 304. The transform coefficients and the quantized transform coefficients will be retrieved and used when creating intermediary images for fade-in and fade-out as explained below.

The input data for the flow chart may be encoded static images, intracoded (I-frame) images from a video stream, macroblock transform coefficients representative of an image, or macroblock quantized transform coefficients representative of an image. It should be recognized that if fade-in or fade-out is the effect to be created, only one input image or data representative of one input image is necessary, since the other image is a monotonic image (e.g. black, white etc.) that is already stored in memory.

In addition to the pre-processing of the monotonic image data, prior to beginning the steps shown in the flow chart of FIGS. 3B-F, if encoded video sequences are being processed, for fade-in, the first I-frame from the video sequence is located. If the process to be performed is fade-out, the last I-frame in the video sequence is identified. For crossfade, the last I-frame in the first video sequence is identified and the first I-frame in the second video sequence is identified. Identification of I-frames in MPEG video sequences is known by those of ordinary skill in the art. The MPEG picture header indicates the frame type and the first frame after a group of pictures header (GOP) is usually an intracoded I-frame.

Figure 3B:
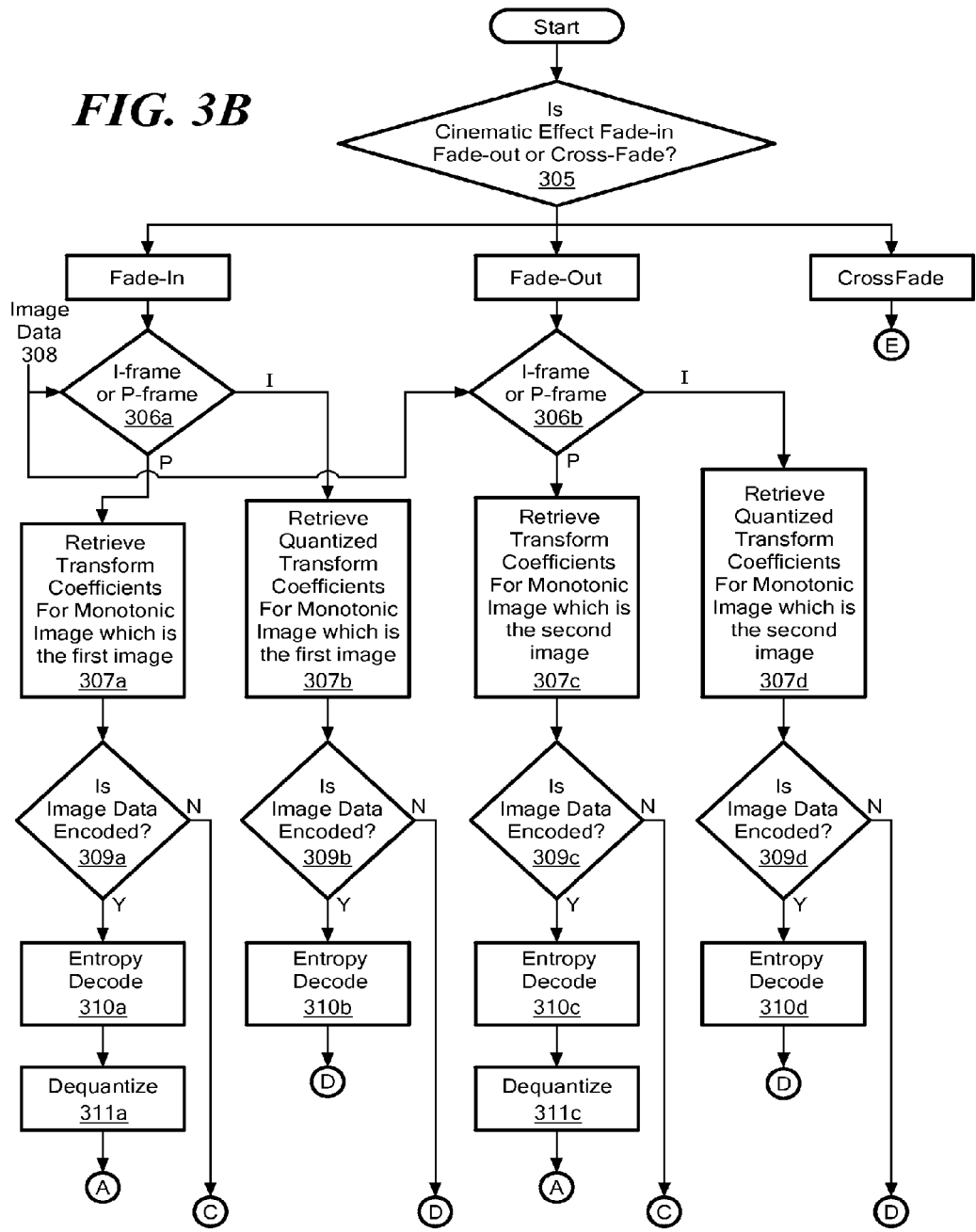
FIG. 3B shows a flow chart wherein the cinematic effect and the frame type is selected.

Returning to the flow charts, first, the cinematic effect to be created is selected between fade-in, fade-out and cross-fade 305 of FIG. 3B. In an automated system, the selection is predefined. After the cinematic effect is determined, the processor determines whether the intermediary frame to be encoded is going to be an I-frame or a P-frame 306a,b,c. Again, in an automated system, such as that shown in FIG. 2, the frame type is predetermined and may be a mixture of I and P frames within a predefined group of pictures (GOP).

For fade-in and fade-out the transform coefficients that have been pre-encoded for the monotonic images are retrieved 307a,b,c,d. Additionally, the image data is received by the processing module. If the intermediary image is an I-frame and the quantization matrix and step size of the image data is the same as that of the monotonic image, quantized transform coefficients are retrieved 307b,d. If the step size of the image data and quantization matrix are not the same or if the intermediary image is to be encoded as a P-frame, transform coefficients are retrieved for the monotonic image 307a, c.

The processing module checks to see if the image data is encoded as an MPEG image 309a,b,c,d. If the image is an MPEG image, then the processing module will entropy decode the MPEG image data 310a,b,c,d. If the intermediary image to be encoded is an I-frame. The step size and quantization matrix are compared to see if they are identical for the first and second images 315 FIG. 3D. If the step size and quantization matrix are the same for the MPEG image data as that for the monotonic image, the quantized transform coefficients will be passed to step A as shown in FIG. 3F for both the received image data and for the monotonic image. If the intermediary image to be encoded is a P-frame or the step size and quantization matrix are not the same, then the processing module will perform an inverse quantization in order to produce the transform coefficients for each macroblock of the image 311a,c. The image data for the first and second images are then passed to step A of FIG. 3F. For fade-in the monotonic image data is the first image data and the received image data is the second image data. For fade-out the received image data is the first image data and the monotonic image data is the second image data.

Figure 3C:
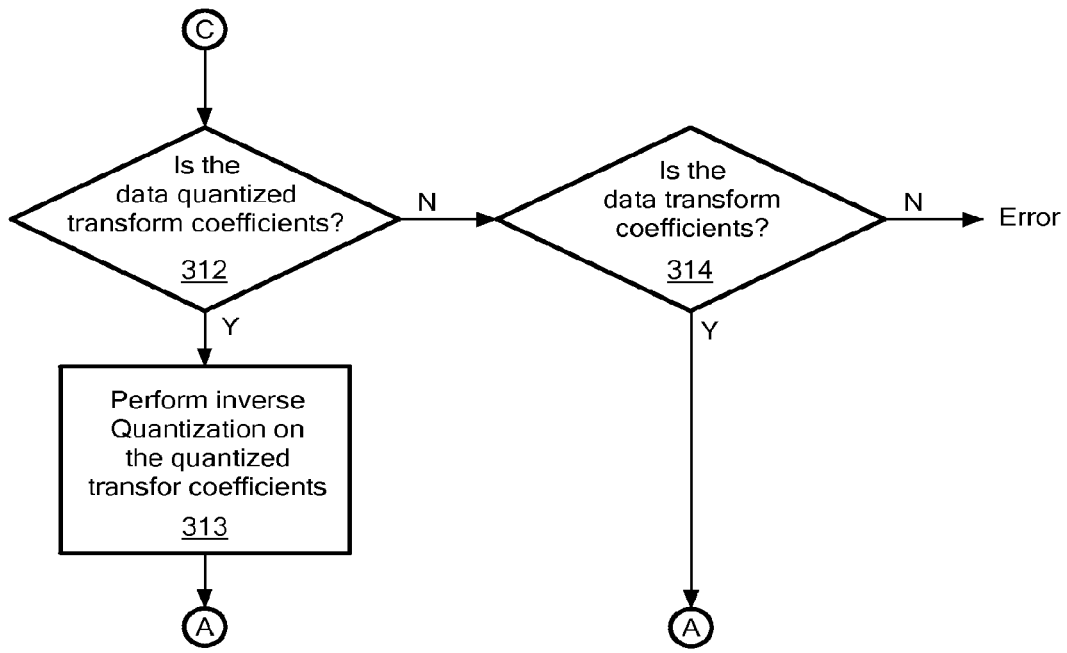
FIG. 3C shows a flow chart for processing image data if the received image data isn't an MPEG I-frame and the intermediary frame type is P-frame.

If the image data is not encoded, the process continues to step C as shown in FIG. 3C if the intermediary frame type is a P-frame or the step size or quantization matrix is not identical to that for the monotonic image. The processing module checks to see if the received image data is quantized transform coefficients 312. If the data is quantized transform coefficients then the processing module applies an inverse quantization 313 creating transform coefficients and then the transform coefficients for the received image and the monotonic image are passed to step A of FIG. 3F. If the received data is not quantized transform coefficients, the processing module checks to see if the data contains transform coefficients for each of the macroblocks for the image 314. If so, the transform coefficients for the received image data and for the monotonic image are passed along to step A of FIG. 3F.

Figure 3D:
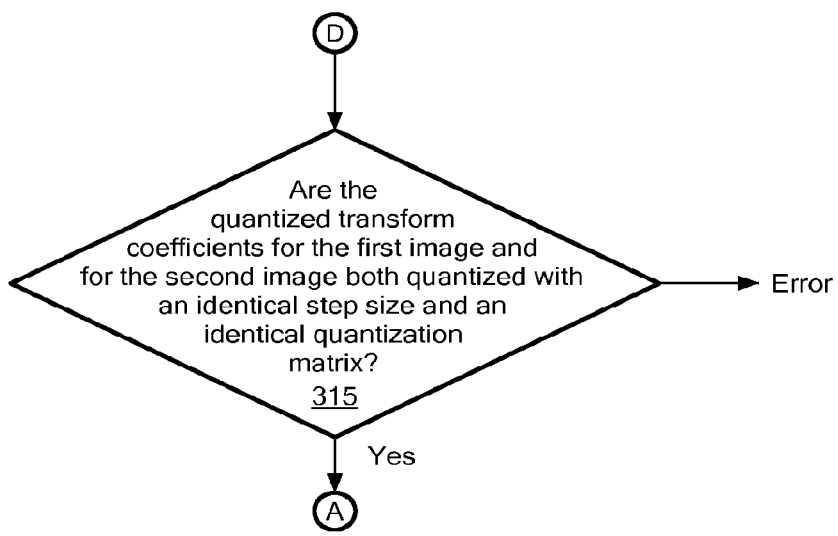
FIG. 3D shows a flow chart for processing image data if the received image data isn't an MPEG I-frame and the intermediary frame type is an I-frame.
Figure 3E:
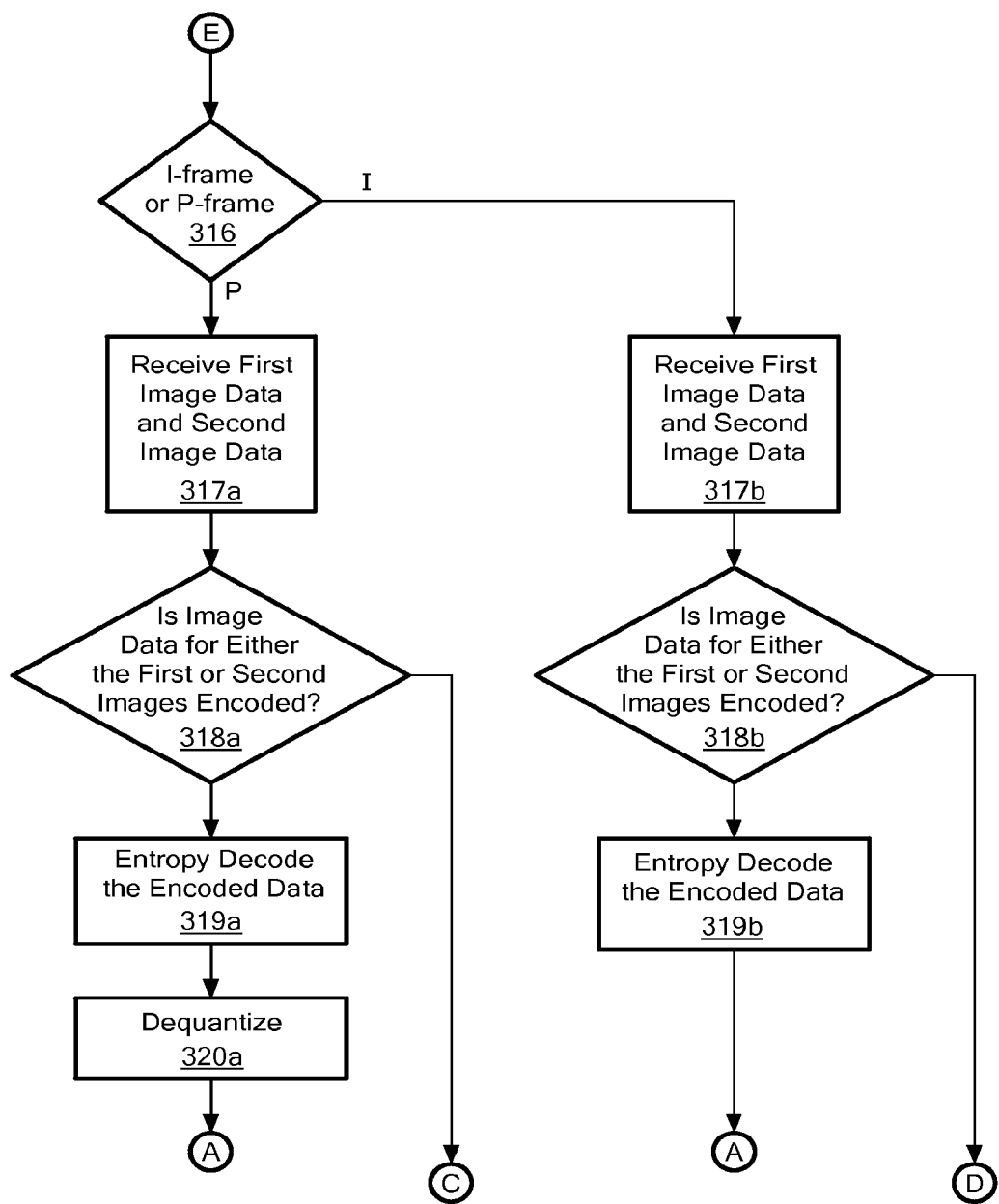
FIG. 3E shows a flow chart for processing image data if the cinematic effect is a crossfade.
Figure 3F:
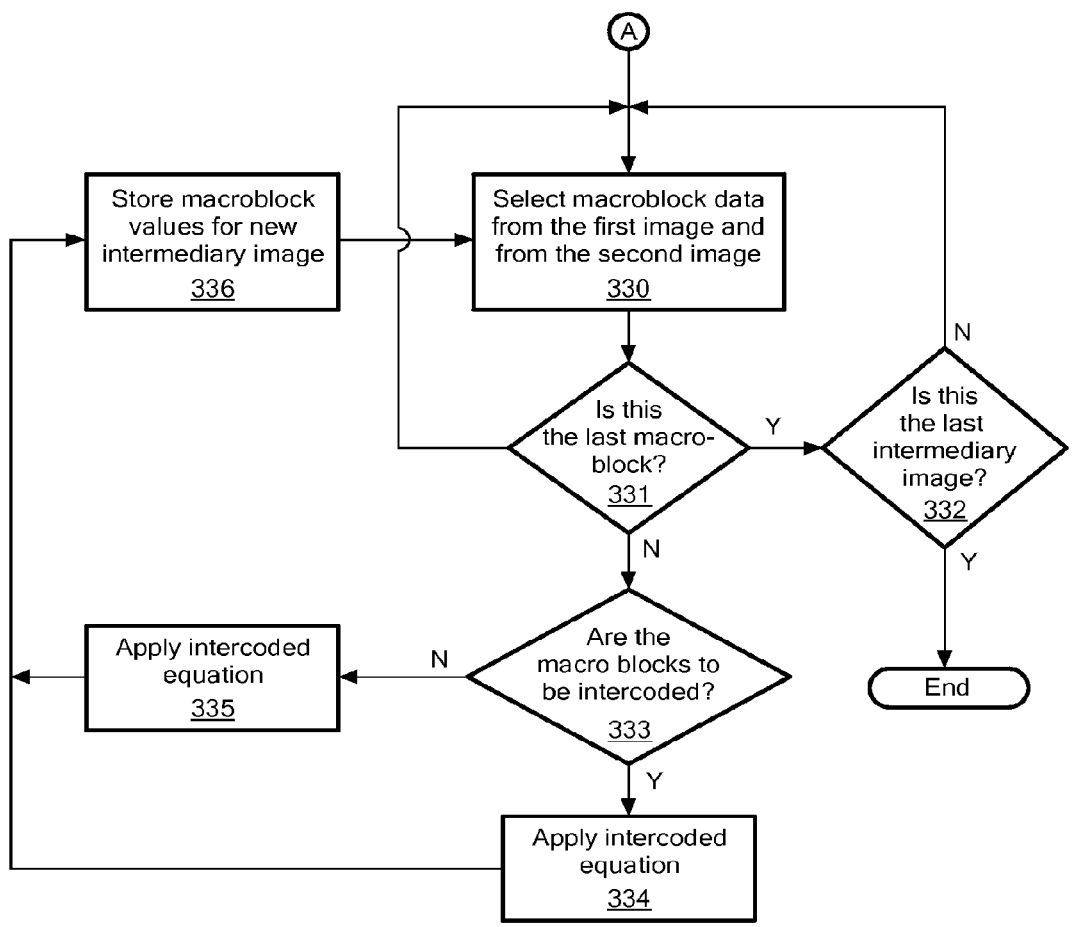
FIG. 3F shows a flow chart for determining the intermediary image data in the transform domain.

If the image data is not encoded and the selected intermediary frame type is an I-frame and the block size and the quantization matrix are identical to the monotonic image data the processing module follows step D in FIG. 3D. The processing module checks to see if the received data is quantized transform coefficients 315. If the data is quantized transform coefficients for the macroblocks of the image then the quantized transform coefficients need not undergo a reverse quantization and the data for both the monotonic image and the received image is passed to step A. In the event that the received data is neither an MPEG I-frame image, quantized transform coefficients nor transform coefficients for the macroblocks of the image, the processing module will report that there is an error.

If the cinematic effect is a crossfade, the same processes are applied, except the processes are applied to each of the two images independently resulting in both data sets being in the same format (either transform coefficients or quantized transform coefficients) before being provided to step A of FIG. 3F. The processing module determines if the intermediary image is going to be an I-frame in 316 in FIG. 3E. The processing module will then retrieve the data for the first and second images 317*a, b*. The processing module ascertains the type of data for each image 318*a,b*. As before the data may be either MPEG encoded data for an I-frame, quantized transform coefficient data or transform coefficient data. The processing module determines if the step size and quantization matrixes are the same for both images. If the step size and quantization matrix are identical then the desired resulting format for the data sets for the two images is transform coefficients. If the data for either or both images is an MPEG I-frame, the data is entropy decoded 319*a,b*. The resulting quantized transform coefficients for both the first and second images are passed on to Step A. If the intermediary image is to be a P-frame then the desired format for further processing is transform coefficients. If the data sets for both images are MPEG I-frames the data is entropy decoded and then dequantized resulting in transform coefficients for both the first and second images 320*a*. These transform coefficients for each macroblock of the first and second images are then passed to step A.

Once the data for both images (monotonic and second image for fade-in, first image and monotonic image for fade-out, or first image and second image for crossfade) are formatted identically, each macroblock position for each image may be processed to determine the corresponding macroblock data set for the intermediary image in accordance with the flow chart of FIG. 3F beginning with A.

The data at the beginning of Step A is either quantized transform coefficients or transform coefficients for each macroblock of the first and second images. The processing module begins by selecting the first macroblock location and the corresponding coefficient data for the first and second images 330. The processing module determines if the selected macroblock location is the last macroblock location for the images 331. If it is, the processing module determines if this is the last intermediary image to be created 332. It should be recognized that one or more intermediary images may be created. If the selected macroblock location is not the last macroblock location, then the processing module looks up the intermediary frame-type and determines if the macroblocks should be interceded as P-frames 333. If the macroblocks are to be interceded, the interceded equations are used 334. The intercoded equations that are applied for each coefficient location are $$DCT(p_{new}) = -\frac{1}{N} \cdot DCT(p_a) + \frac{1}{N} \cdot DCT(p_b) \quad \text{for fade in and cross fade}$$

$$DCT(p_{new}) = \frac{1}{N} \cdot DCT(p_a) - \frac{1}{N} \cdot DCT(p_b) \quad \text{for fade in and cross fade}$$

where $p_a$ and $p_b$ represent the transform coefficients at a single position within the 16×16 macroblock grouping for the first and second images respectively and $$\alpha = \frac{n}{N},$$

where n is the n-th frame of the desired intermediary sequence having N total frames.

If the frame is going to be intracoded then the intracoded equations are used 335. The intracoded equations that are used for each transform coefficient or quantized transform coefficient value will be:

$$DCT(p_{new}) = \frac{n}{N} \cdot DCT(p_a) + \frac{N-n}{N} \cdot DCT(p_b) \quad \text{for fade in and cross fade}$$

$$DCT(p_{new}) = \frac{N-n}{N} \cdot DCT(p_a) + \frac{n}{N} \cdot DCT(p_b) \quad \text{for fade out}$$

Since there are accumulated prediction errors, it is appropriate to choose GOP size as 4. Thus, for example, for a GOP of 4, for every four intermediary images, there could be one I-frame and three P-frames or 4 I-frames.

The coefficient values for each macroblock are then stored in memory for the new intermediary image 336. The process then continues wherein a next macroblock of 16×16 frequency coefficient values or quantized frequency coefficient values is selected. Each coefficient value for the intermediary image is determined based upon the coefficient values located at the same location within the 16×16 grid. The processing module proceeds to calculate values for each location of the image. The processing module will finish once the transform coefficients or quantized transform coefficient values are determined for each of the desired number of intermediary images.

The first image data, the intermediary image data, and the second image data may then be processed to create an MPEG data stream. If all of the image data is quantized transform coefficients, the data for each image frame will be placed in sequential order and the data will then be entropy encoded. If the image data is transform coefficient data, the transform coefficients for the first image, intermediary images, and the second image will be quantized using the same step size and quantization matrix and then the data will be subsequently entropy encoded, creating an MPEG data stream. The MPEG data stream may then be transmitted and decoded by an MPEG decoder wherein the cinematic effect will be present between the two images.

In other embodiments, the system may create transitions using P-formatted video frames. Macroblocks in P-frames may be intra-frame encoded or inter-frame encoded. As before, the intra-frame encoded macroblocks will be processed using the equations provided above without further manipulation of the data within the macroblocks. In contrast, if the macroblocks are interceded, the macroblock will be spatially decoded and then re-encoded as an intra-frame encoded macroblock prior to employing the above described techniques. Thus, if a motion vector in frame 2 points to intracoded data of a macroblock in frame 1, the system will first decode the intracoded macroblock from frame 1 and account for the prediction error forming a spatial representation of the macroblock for frame 2. The spatial data for the macroblock from frame 2 will then be re-encoded using the DCT. The data for the macroblock will then be intra-frame encoded and the same equations for determining the transition frame data may be used.

Figure 4:
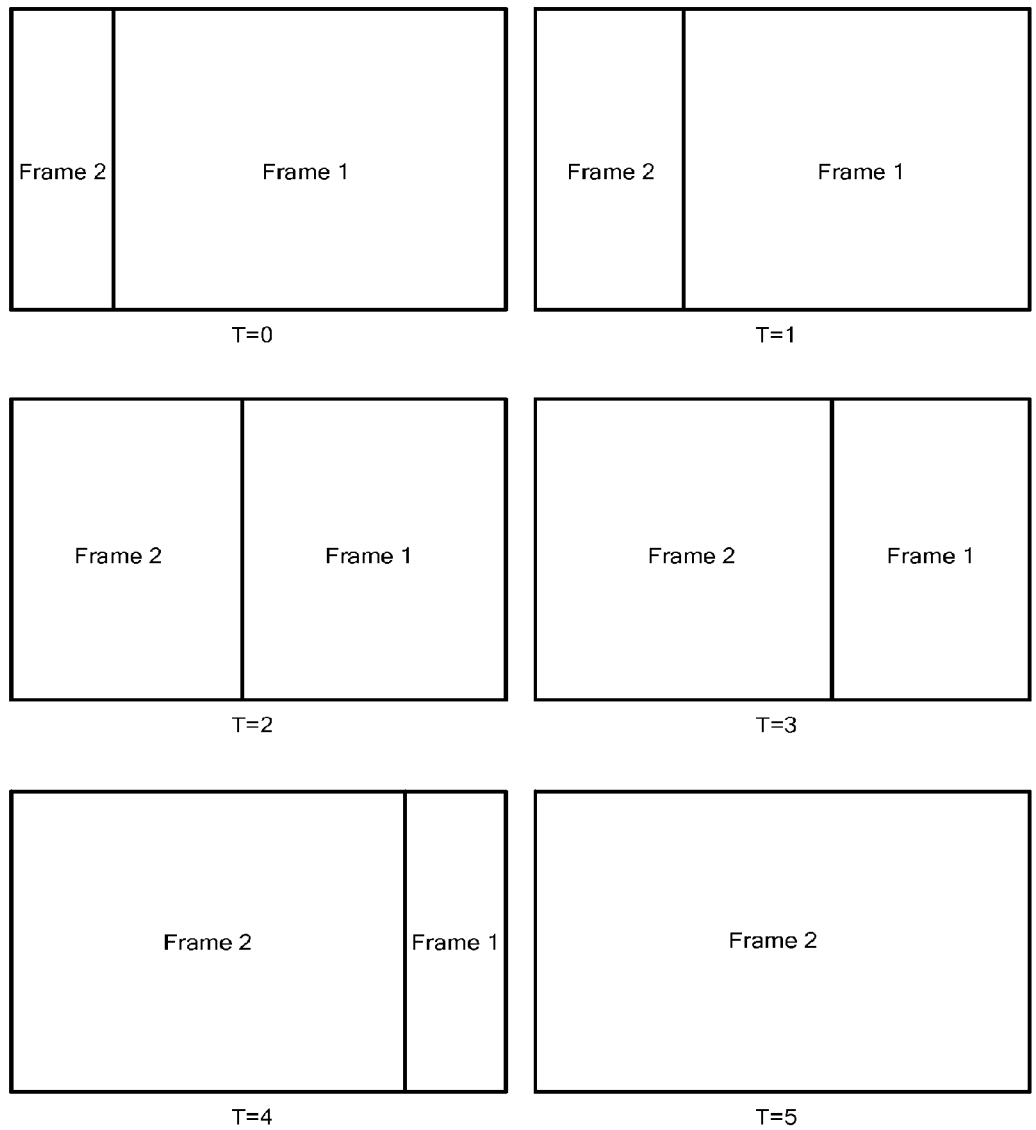
FIG. 4 shows a series of video frames wherein the transition provides a left-to-right wipe.

The present invention may also create other transition effects. For example, left-to-right and right-to-left fades can be created by adjusting the weighting factor to the above equations. For a left-to-right or a right-to-left transition between two frames, the weighting factor would vary across the screen. Thus, rather than the entire image transitioning between a first frame state and a second frame state, portions of the frame would transition at different rates. As shown in FIG. 4, the left most part of the frame may transition quickly between a first frame and a second frame while the right side of the image transitions at a much slower rate. FIG. 4 shows the transition from frame 1 to frame 2 occurs over 6 time periods from time T=0 to time T=5. Frame 2 occupies the entire screen at time T=5.

Still further transition effects can be created. The weighting factor can vary spatially across each frame and temporally between frames. Thus, the weighting factor can be associated with an equation or set of equations that vary based upon different parameters such as an X dimension (spatial direction), a Y dimension (spatial direction), and a T dimension (time). In other embodiments, the weighting factor may simply be a set or matrix of predetermined values wherein each value is applied to one or more macroblocks of a frame. Additionally, multiple sets or matrices of predetermined values may be used wherein each set or matrix is applied to a different frame of the series of transition frames. Therefore, transitions, such as faded wipes, dissolves, flashes, creation of random lines during the transition can be constructed in the encoded domain.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g. a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for calculating data representative of at least one intermediary transition image between a first image and a second image wherein the first and second images are represented by transform encoded data and each image having a plurality of locations associated with the transform encoded data, the method comprising:
   determining if the intermediary image will be intraframe or interframe encoded;
   for each corresponding location within the first and second image, calculating a transform coded value for the at least one intermediary image using the transform encoded data of the first and second images without transform decoding the transform encoded data;
   if the intermediary image is to be intraframe encoded, selecting an intraframe encoded equation for determining the transform coded value for the at least one intermediary image;
   if the intermediary image is to interframe encoded, selecting an interframe encoded equation for determining the transform coded values for the at least one intermediary image; and
   storing the transform coded values for the at least one intermediary image to memory.

2. The method for calculating data representative of at least one intermediary transition image according to claim 1, wherein the first image is from a first video sequence and the second image is from a second video sequence.

3. The method according to claim 2, wherein the first video image is intra-frame encoded.

4. The method according to claim 3, wherein the second video image is intra-frame encoded.

5. The method according to claim 3 further comprising:
entropy decoding the first and second MPEG images; and
dequantizing the first and second MPEG images producing transform data for the first and second MPEG images.

6. The method according to claim 1, wherein the first image is a still image.

7. The method according to claim 6, wherein the second image is a still image.

8. The method according to claim 1, further comprising:
parsing the first video image from a first video sequence.

9. The method according to claim 8, wherein the first video image is intra-coded.

10. The method according to claim 1, further comprising:
parsing the second video image from a second video sequence.

11. The method according to claim 10, wherein the second video image is intra-coded.

12. The method according to claim 1 wherein the first and second images are MPEG encoded.

13. The method according to claim 1, wherein determining transform coded values includes
multiplying the transform encoded data of the first image by a percentage value and the transform encoded data of the second image by 1−the percentage value;
adding the multiplied transform data for the first image and the second image to form transform coded data of the intermediary image.

14. The method according to claim 1 further comprising:
inserting the transform coded data representative of the intermediary image between transform data representative of the first and the second image.

15. The method according to claim 14, further comprising:
quantizing the data representative of the first, second, and intermediary images;
entropy encoding the data representative of the first, second, and intermediary images producing an encoded data stream.

16. The method according to claim 15 wherein decoding and display of the encoded data stream produces a fade-in of the second image.

17. The method according to claim 15 wherein decoding and display of the encoded data stream produces a fade-out of the first image.

18. The method according to claim 15 wherein decoding and display of the encoded data stream produces a cross-fade between the first and second images.

19. The method according to claim 15 wherein decoding and display of the encoded data stream provides a wipe between the first and second images.

20. The method according to claim 1 wherein the first image is a monotonic image.

21. The method according to claim 1 wherein the second image is a monotonic image.

22. A method for calculating data representative of at least one intermediary transition image between a first image and a second image wherein the first and second images are represented by encoded data, the method comprising:
determining a type of cinematic effect to be created between the first and second images;
determining if the intermediary image will be intraframe or interframe encoded;
for each corresponding location within the first and second image, calculating a transform coded value for the at least one intermediary image using the transform encoded data of the first and second images without transform decoding the transform encoded data;
if the intermediary image is to be intraframe encoded, selecting an intraframe encoded equation for determining the transform coded value for the at least one intermediary image based on the cinematic effect;
if the intermediary image is to interframe encoded, selecting an interframe encoded equation for determining the transform coded values for the at least one intermediary image based on the cinematic effect; and
storing the transform coded values for the at least one intermediary image to memory.

23. A method for calculating data representative of at least one intermediary transition image between a first image and a second image wherein the first and second images are represented by encoded data, such that the encoded data from the first image and the encoded data from the second image comprise quantized transform coefficients for a plurality of locations the method comprising:
determining if the at least one intermediary transition image is to be intracoded;
determining whether the encoded data for the first image and the encoded data for the second image have both been quantized using an identical step size and an identical quantization matrix,
if the at least one intermediary transition image is to be intracoded and the step size and quantization matrix are the same for both the first image and the second image, for each corresponding location within the first and second image, calculating a quantized transform coded value for a corresponding location of the at least one intermediary transition image using the quantized transform coefficients from the first and second images; and
storing the quantized transform coded value for each location to memory.

24. A computer program product comprising a non-transitory computer readable storage medium having computer code thereon for calculating data representative of at least one intermediary transition image between a first MPEG image and a second MPEG image, the computer code comprising:
computer code for determining if the at least one intermediary transition image will be intraframe or interframe encoded;
computer code for determining transform coded values for the at least one intermediary transition image without transform decoding data from the first and second MPEG images;
where if the at least one intermediary transition image is to be intraframe encoded, selecting an intraframe encoded equation for determining the transform coded value for the at least one intermediary transition image;
if the at least one intermediary transition image is to interframe encoded, selecting an interframe encoded equation for determining the transform coded values for the at least one intermediary transition image; and
computer code for storing the transform coded values for the at least one intermediary image to memory.

25. The computer program product according to claim 24, wherein the first image is from a first video sequence and the second image is from a second video sequence.

26. computer program product according to claim 24, wherein the first video image is intra-frame encoded.

27. The computer program product according to claim 26, wherein the second video image is intra-frame encoded.

28. The computer program product according to claim 24, wherein the first image is a still image.

29. The computer program product according to claim 24 further comprising:
computer code for entropy decoding the first and second MPEG images; and
computer code for dequantizing the first and second MPEG images producing transform data for the first and second MPEG images.

30. The computer program product according to claim 24, wherein the computer code for determining transform coded values includes:
computer code for multiplying the transform data of the first image by a percentage value and the transform data of the second image by 1−the percentage value;
computer code for adding the multiplied transform data for the first image and the second image to form transform coded data of the at least one intermediary transition image.

31. The computer program product according to claim 24 further comprising:
computer code for inserting the transform coded data representative of the intermediary image between transform data representative of the first and the second image.

32. The computer program product according to claim 31, further comprising:
computer code for quantizing the data representative of the first, second, and intermediary images;
computer code for entropy encoding the data representative of the first, second, and intermediary images producing an MPEG data stream.

33. The computer program product according to claim 32 wherein decoding and display of the MPEG data stream produces a fade-in of the second image.

34. The computer program product according to claim 32 wherein decoding and display of the MPEG data stream produces a fade-out of the first image.

35. The computer program product according to claim 32 wherein decoding and display of the MPEG data stream produces a cross-fade between the first and second images.

36. The computer program product according 24, wherein the first MPEG image is a monotonic image.

37. The computer program product according 24 wherein the second MPEG image is a monotonic image.

38. A method for calculating data representative of at least one intermediary transition image between a first image and a second image wherein the first and second images are represented by encoded data comprising a quantized transform coefficient for a plurality of locations, the method comprising:
determining if the at least one intermediary transition image is to be intracoded;
determining whether the encoded data for the first image and the the encoded data for the second image have both been quantized using an identical step size and identical quantization matrix;
if the at least one intermediary transition image is to be intracoded and the step size and quantization matrix are the same for the encoded data from both the first image and the second image, for each corresponding location within the first and second image, calculating a quantized transform coded value for the at least one intermediary transition image using quantized transform coefficients from the first and second images for the location; and
storing the quantized transform coded value for each location to memory.

* * * * *